(12) United States Patent
Xue et al.

(10) Patent No.: US 10,922,871 B2
(45) Date of Patent: Feb. 16, 2021

(54) CASTING A RAY PROJECTION FROM A PERSPECTIVE VIEW

(71) Applicant: BAMTECH LLC, New York, NY (US)

(72) Inventors: Yuanyi Xue, New York, NY (US); Joseph Inzerillo, New York, NY (US); Dirk Van Dall, New York, NY (US)

(73) Assignee: BAMTECH, LLC, New York, NY (US)

(*) Notice: Subject to any disclaimer, the term of this patent is extended or adjusted under 35 U.S.C. 154(b) by 63 days.

(21) Appl. No.: 16/215,110

(22) Filed: Dec. 10, 2018

(65) Prior Publication Data

US 2019/0228559 A1    Jul. 25, 2019

Related U.S. Application Data

(60) Provisional application No. 62/619,588, filed on Jan. 19, 2018.

(51) Int. Cl.
*H04N 7/18*      (2006.01)
*G06T 15/06*     (2011.01)
(Continued)

(52) U.S. Cl.
CPC .......... *G06T 15/06* (2013.01); *G06K 9/00369* (2013.01); *G06K 9/00624* (2013.01);
(Continued)

(58) Field of Classification Search
CPC .. G06F 16/532; G06F 16/5838; G06F 16/738; G06F 16/783; G06K 9/00671; G06K 9/00369; G06K 9/00624; G06K 9/00724; G06K 9/623; G06K 9/6261; G06K 9/726; G06T 3/4038; G06T 7/174; G06T 15/06; H04N 13/243; H04N 13/279;
(Continued)

(56) References Cited

U.S. PATENT DOCUMENTS 5,627,915 A    5/1997   Rosser et al.
5,731,846 A    3/1998   Kreitman et al.
(Continued)

FOREIGN PATENT DOCUMENTS

EP      2034747      3/2009
EP      3065085      9/2016

OTHER PUBLICATIONS

D'Orazio et al.,"A review of vision-based systems for soccer video analysis", Pattern Recognition, Elsevier, GB, vol. 43, No. 8, Aug. 1, 2010, pp. 2911-2926.

*Primary Examiner* — Gims S Philippe
(74) *Attorney, Agent, or Firm* — Fay Kaplun & Marcin, LLP (57) ABSTRACT

A device, system, and method cast a ray projection from a perspective view. The method includes determining a first mask for a first object from a first frame captured by a first camera. The method includes determining a second mask for the first object from a second frame captured by a second camera. The method includes generating a 3D mask by associating the first mask and the second mask. The method includes determining a location of the 3D mask. The method includes generating the ray projection of the 3D mask from a perspective of a second object.

20 Claims, 6 Drawing Sheets

(51) Int. Cl.

| | | |
|---|---|---|
| *G06K 9/00* | (2006.01) | |
| *G06T 15/20* | (2011.01) | |
| *G06N 3/04* | (2006.01) | |
| *G06N 3/08* | (2006.01) | |
| *G06T 7/73* | (2017.01) | |
| *G06T 7/80* | (2017.01) | |
| *G06T 7/70* | (2017.01) | |
| *G06K 9/62* | (2006.01) | |
| *G06K 9/72* | (2006.01) | |
| *H04N 5/247* | (2006.01) | |
| *G06T 7/12* | (2017.01) | |
| *G06T 7/13* | (2017.01) | |

(52) U.S. Cl.
CPC ....... *G06K 9/00724* (2013.01); *G06K 9/6261* (2013.01); *G06K 9/726* (2013.01); *G06N 3/0454* (2013.01); *G06N 3/08* (2013.01); *G06N 3/082* (2013.01); *G06T 7/70* (2017.01); *G06T 7/74* (2017.01); *G06T 7/80* (2017.01); *G06T 15/20* (2013.01); *G06T 15/205* (2013.01); *H04N 5/247* (2013.01); *G06K 9/623* (2013.01); *G06T 7/12* (2017.01); *G06T 7/13* (2017.01); *G06T 2207/10016* (2013.01); *G06T 2207/10024* (2013.01); *G06T 2207/20081* (2013.01); *G06T 2207/20084* (2013.01); *G06T 2207/30221* (2013.01); *G06T 2207/30224* (2013.01); *G06T 2207/30244* (2013.01)

(58) Field of Classification Search
CPC ...... H04N 13/282; G06N 3/0454; G06N 3/08; G06N 3/082
USPC .......................................................... 348/157
See application file for complete search history.

(56) References Cited

U.S. PATENT DOCUMENTS

| | | | |
|---|---|---|---|
| 6,741,725 | B2 | 5/2004 | Astle |
| 8,731,239 | B2 | 5/2014 | Gefen |
| 8,786,596 | B2 | 7/2014 | House |
| 9,031,279 | B2 | 5/2015 | Gefen et al. |
| 9,530,240 | B2 | 12/2016 | Wang et al. |
| 2009/0128548 | A1 | 5/2009 | Gloudemans et al. |
| 2013/0002649 | A1* | 1/2013 | Wu ................... G06T 19/006 345/419 |
| 2013/0016097 | A1* | 1/2013 | Coene ................ G06T 15/205 345/419 |
| 2014/0313293 | A1* | 10/2014 | Kim ...................... G06T 7/55 348/46 |
| 2017/0148222 | A1* | 5/2017 | Holzer ............... H04N 13/243 |
| 2018/0032840 | A1* | 2/2018 | Yu .................... G06K 9/00288 |

\* cited by examiner

CASTING A RAY PROJECTION FROM A PERSPECTIVE VIEW

PRIORITY CLAIM/INCORPORATION BY REFERENCE

This application claims priority to U.S. Provisional Application 62/619,588 entitled "Casting a Ray Projection from a Perspective View," filed on Jan. 19, 2018, the entirety of which is incorporated herein by reference.

BACKGROUND

Viewers of some sporting events may desire to see a point of view of an object or a participant (e.g., athlete) associated with the sporting event. For example, in ice hockey, it may be desirable to display the areas around a goalmouth of a goal that are obstructed by objects/players (e.g., a goalie, defensive players, offensive players, equipment, etc.) from a point of view of a hockey puck (e.g., stationary or traveling) or a player shooting the puck (e.g., a field of view from the perspective of the player). Other sporting events may also include goals for which the obstructed areas of the goalmouth may be displayed (e.g., soccer, water polo, etc.). Conventional approaches that attempt to generate a mask corresponding to the obstructed areas of the goalmouth may be inaccurate and a resulting rendering based on the inaccurate mask may not accurately portray the conditions.

DETAILED DESCRIPTION

The exemplary embodiments may be further understood with reference to the following description of exemplary embodiments and the related appended drawings, wherein like elements are provided with the same reference numerals. The exemplary embodiments relate to casting a ray projection from a perspective view of an object (e.g., inanimate or alive). The exemplary embodiments are configured to find the boundaries of a real-world volume to determine the occlusion from a point cast to an area. The ray projection may be cast on the area illustrating the occlusion from identified occluding objects.

The exemplary embodiments are described with reference to the sport of ice hockey. In particular, references will be made to a hockey arena, hockey goals, a hockey puck, hockey players, hockey sticks, etc. However, those skilled in the art will understand that the exemplary embodiments may relate to other sporting events, that include goals similar to hockey such as, but not limited to soccer, field hockey, lacrosse, water polo, etc. In addition, the exemplary embodiments may be extended to other sports where the goals are dissimilar, e.g., in football, the uprights may be considered the stationary goal, in basketball the backboard may be considered the stationary goal, etc. In these examples, the boundaries of a real-world volume and determined occlusion may be any player(s) or equipment between an object (including another player) and the goal. Those skilled in the art will further understand that the exemplary embodiments may be used in sporting events not involving a goal or non-sport related scenarios, such as those that include recognizing an object(s) and casting a ray projection from a desired perspective view to an area.

The exemplary embodiments are described with particular features of ice hockey and particular characteristics or descriptors of components. For example, the exemplary embodiments are described from a perspective of a puck or a head of a player. However, the use of the puck or head is only exemplary and may represent any object from which a perspective may be used in casting a ray projection. As noted above, when the exemplary embodiments are implemented in a different event (e.g., soccer), the exemplary embodiments may utilize a perspective of a different object (e.g., soccer ball). In another example, the exemplary embodiments may include a plurality of cameras that capture a goalmouth, is positioned to capture a catwalk, etc. However, the descriptors of the goalmouth, the catwalk, etc. are only exemplary and used for illustrative purposes with regard to a specific implementation of the exemplary embodiments. Thus, any reference to a particular feature or descriptor as used herein may represent any feature or descriptor that may be implemented by the exemplary embodiments.

Figure 1:
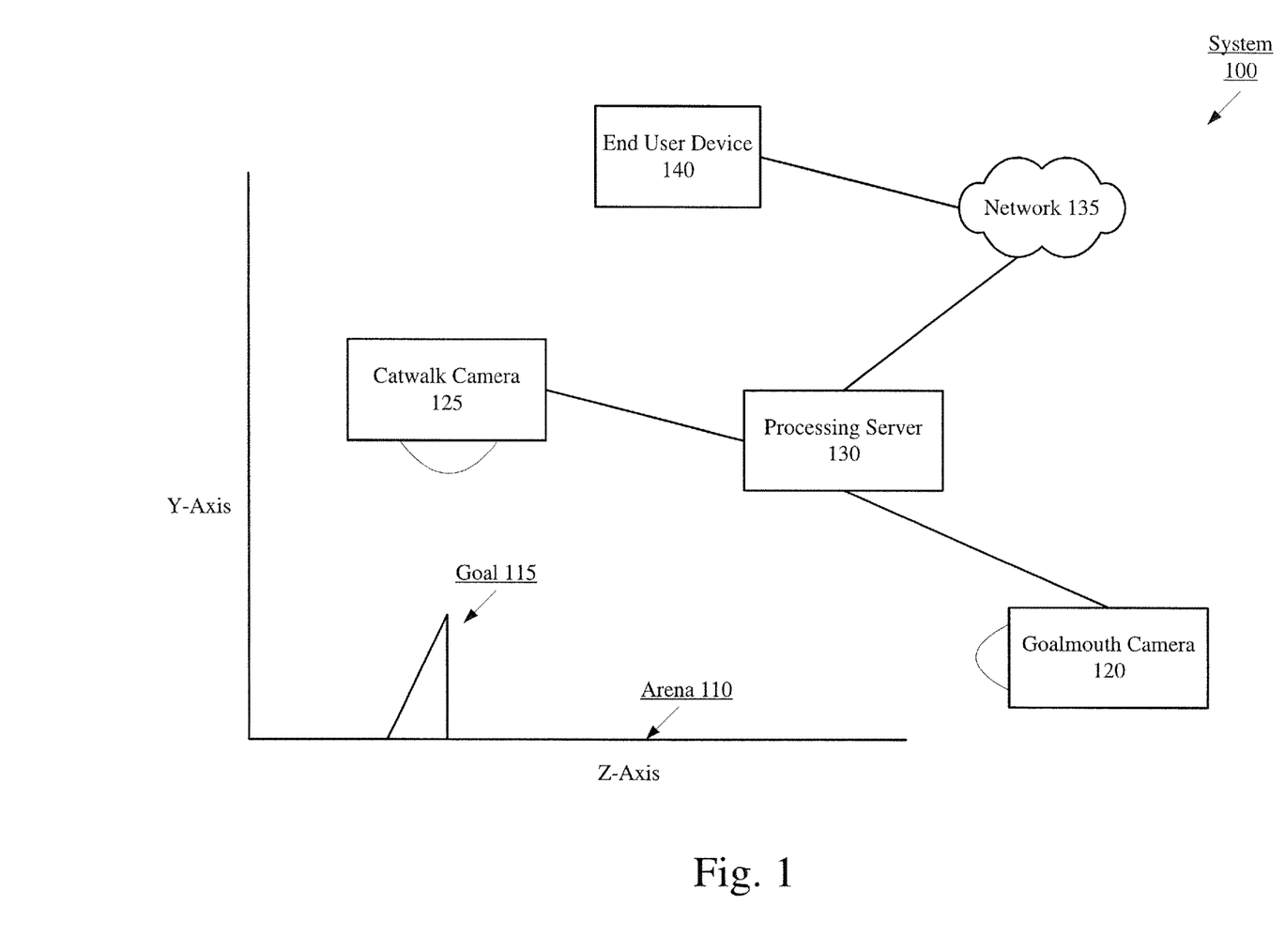
FIG. 1 illustrates a system for casting a ray projection according to various exemplary embodiments described herein.
Figure 2A:
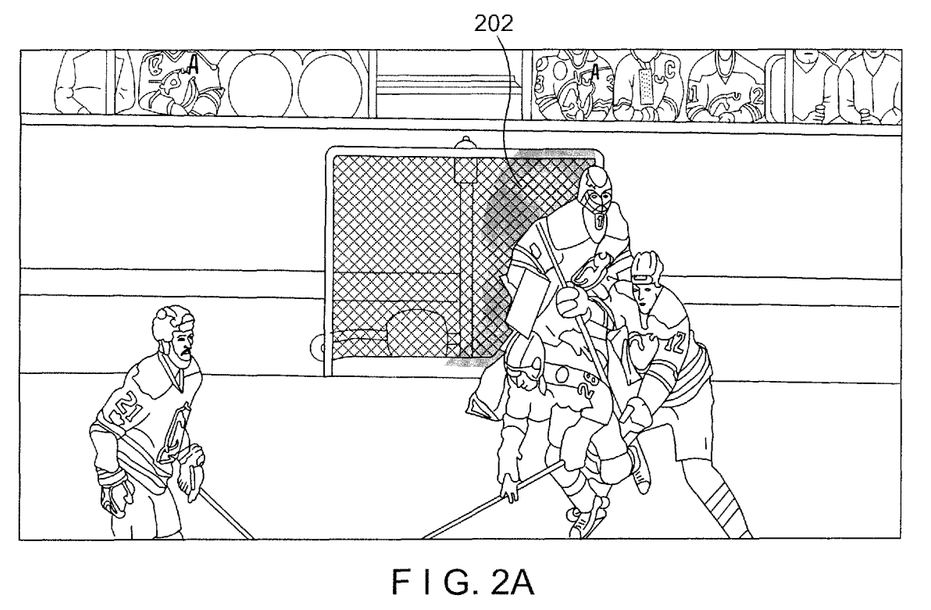
FIG. 2A illustrates a first exemplary visualization of a ray projection from a first perspective according to various exemplary embodiments described herein.

FIG. 1 illustrates an exemplary system 100 for casting a ray projection according to various exemplary embodiments described herein. The system 100 may include an arena 110, a goal 115, a goalmouth camera 120, a catwalk camera 125, a processing server 130, a network 135, and an end user device 140. The goalmouth camera 120 may be positioned to face the goalmouth of the goal 115. FIG. 2A shows an exemplary view as seen by the goalmouth camera. The goalmouth camera 120 may be facing the goalmouth of the goal 115 at a parallel, an elevated, or an offset position. The goalmouth camera 120 may be oriented to capture an image of an area such that selected dimensions of objects in the area may be determined relative to a reference point. Accordingly, the goalmouth camera 120 may be positioned in any manner and may represent any capturing component configured to provide this dimensional information of the objects. As will be described herein, the goalmouth camera 120 may be configured to provide dimensional information of objects along an x-axis and a y-axis in space. However, this dimensional information and the corresponding orientation of the goalmouth camera 120 (along with its description as a camera facing a goalmouth) is only for illustrative purposes and the goalmouth camera 120 may be configured to capture fewer or additional dimensions. As will be described in detail below, FIG. 2A shows a resulting ray projection that is cast on the goalmouth according to the exemplary embodiments from a first perspective.

Figure 2B:
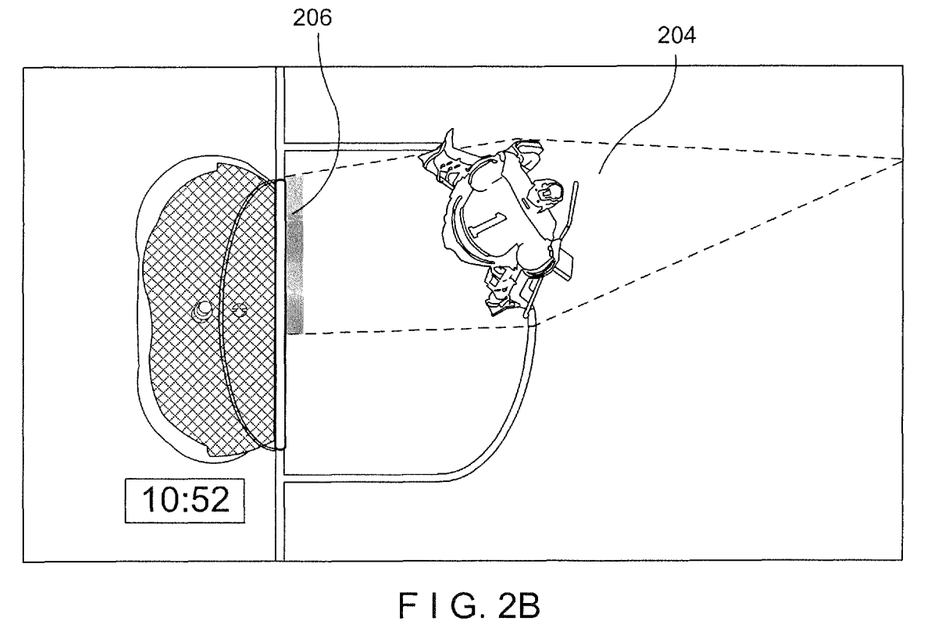
FIG. 2B illustrates a second exemplary visualization of a ray projection from a second perspective according to various exemplary embodiments described herein.

The catwalk camera 125 may be positioned overhead of the goal 115. Alternatively, the catwalk camera 125 may be positioned at an offset from a center (e.g., coordinate 0, 0, 0) of the goal 115. The catwalk camera 125 may generate dimensional information that complements the dimensional information of the goalmouth camera 120 for objects in the area. For example, the catwalk camera may be oriented to capture an image of the area relative to the same reference point. It is noted that the areas captured by the goalmouth camera 120 and the catwalk camera 125 may be calibrated such that at least a portion of each the images covers the same area in space at the respective dimensions. The catwalk camera 125 may also be positioned in any manner and may represent any capturing component configured to provide complementary dimensional information of the objects. As will be described herein, the catwalk camera 125 may be configured to provide complementary dimensional information of objects along at least a z-axis in space (e.g., the x-axis and the z-axis). However, this dimensional information and the corresponding orientation of the catwalk camera 125 (along with its description as a camera positioned on a catwalk) is only for illustrative purposes and the catwalk camera 125 may be configured to capture the complementary dimensions in any manner. FIG. 2B shows an exemplary view as seen by the catwalk camera. As will be described in detail below, FIG. 2B shows the resulting ray projection that is cast on the goalmouth corresponding to FIG. 2A from a second perspective.

It should be understood that the goalmouth camera 120 and the catwalk camera 125 may record in the same resolution or in different resolutions. For example, the goalmouth camera 120 may record in 4 k high definition and the catwalk camera 125 may record in regular 1080p. In addition, the goalmouth camera 120 and the catwalk camera 125 may be any type of camera configured to capture images and provide corresponding data for processing according to the exemplary embodiments. For example, the cameras 120, 125 may be static or moving, the cameras may be instrumented (e.g., an instrumented pan-tilt-zoom (PTZ) camera), etc. Although exemplary embodiments relate to two video cameras, those skilled in the art would understand that the use of video cameras is exemplary. Other data capture devices may be used instead of or in addition to either the goalmouth camera 120 or the catwalk camera 125, such as inertial sensors, detectors, radar guns, LIDAR sensors, etc. It should also be understood that the use of two motion capture devices is only exemplary, and that any number of motion capture devices may be used. For illustrative purposes, the system 100 is described with regard to two separate cameras. However, as will be described in detail below, the system 100 may also utilize a single camera (e.g., when the single camera is an instrumented PTZ camera, when metadata compensating for a second camera is available, when a frame-by-frame calibration is available when the single camera is moving, when a co-located depth sensor is available to provide depth information, etc.).

In the exemplary embodiments, the catwalk camera 125 and the goalmouth camera 120 are orthogonal to each other. The camera plane of the catwalk camera 125 is parallel to the ice surface and the camera plane of the goalmouth camera 120 is parallel to the plane of the goalmouth opening. In this manner, the goalmouth camera 120 may be configured to generate binary masks of objects/players while the catwalk camera 125 may be configured to generate a mask indicative of where objects/players are located relative to one another. However, it should be understood that this orientation is not a requirement. Camera calibration methods allow for variations of the camera planes based on the physical orientation of the cameras that are used in the exemplary processes described herein. The camera planes may have variations because of, for example, physical limitations associated with particular arenas. For example, because of lighting or sound equipment, the catwalk camera 125 may have to be offset from the center of the goal. In another example, because of the interference of the opposite goal, the goalmouth camera 120 may be placed at a slightly higher level. However, as described above, since the parameters of the arena are known or can be measured, e.g., the exact size of the goal mouth, the distance of the cameras to the goal mouth/ice, etc., the cameras may still be calibrated when off-axis from the planes described above. In addition, because of the tolerance afforded by the camera calibration, the stadium to stadium installation variation can be handled with a minimum amount of one-time human intervention. As described above, the use of two cameras is only exemplary. For example, additional cameras that have different perspectives may also be used. The use of additional cameras may provide further information that may increase an accuracy in which to cast a ray projection according to the exemplary embodiments.

The goalmouth camera 120 and the catwalk camera 125 may record data from an event, such as a hockey game, and feed the data to the processing server 130. The data may include frames recorded by each camera. Each frame may be time stamped to link frames captured by the goalmouth camera 120 to frames captured by the catwalk camera 125. For example, the two frames shown in FIGS. 2A and 2B may be timestamped to indicate that both were captured at a same moment in time. Those skilled in the art will understand that the system 100 may utilize any synchronization mechanism so that frames are aligned (e.g., synchronizing through a system clock, synchronizing individual clocks, determination of likeness, etc.).

The processing server 130 may process the data to cast the ray projection on the goalmouth. The processing server 130 may perform a plurality of operations on the data received from the goalmouth camera 120 and the catwalk camera 125 to determine a ray projection on an area to be rendered on a device. The processing server 130 may include the necessary hardware, software, or firmware to perform its functionality described herein. For example, the processing server 130 may include a processor, a memory arrangement, a transceiver, etc. As will become apparent below, the casting of the ray projection according to the exemplary embodiments may utilize a set of operations that improve an accuracy of generating the ray projection in a manner that improves the efficiency with which the processor is used and using selected data and feature sets that also improves the efficiency with which the memory arrangement is used. As used herein, a feature set may represent an intermediate output within a neural network. The processing server 130 may then transmit the processed data, via the network 135, to the end user device 140 for viewing by a viewer.

The network 135 may be any type of wired or wireless network. The network 135 may be configured to communicatively connect the various components of the system 100 to exchange data. The network 135 may represent any single or plurality of networks used by the components of the system 100 to communicate with one another. For example, the network 135 may be connected to the Internet. It should be noted that the network 135 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The network 135 may also include any number of components (e.g., servers including the processing server 130, routers, network management arrangements, etc.).

The end user terminal 140 may be a television, a personal computer, a mobile phone, a tablet, an augmented reality device, a virtual reality device, etc. The end user terminal 140 may include the necessary hardware, software, or firmware to generate a visual representation of the ray projection being cast on an area (e.g., goalmouth) corresponding to data received from the processing server 130. For example, the end user terminal 140 may include a processor, a memory arrangement, a transceiver, a display device, etc.

Figure 3:
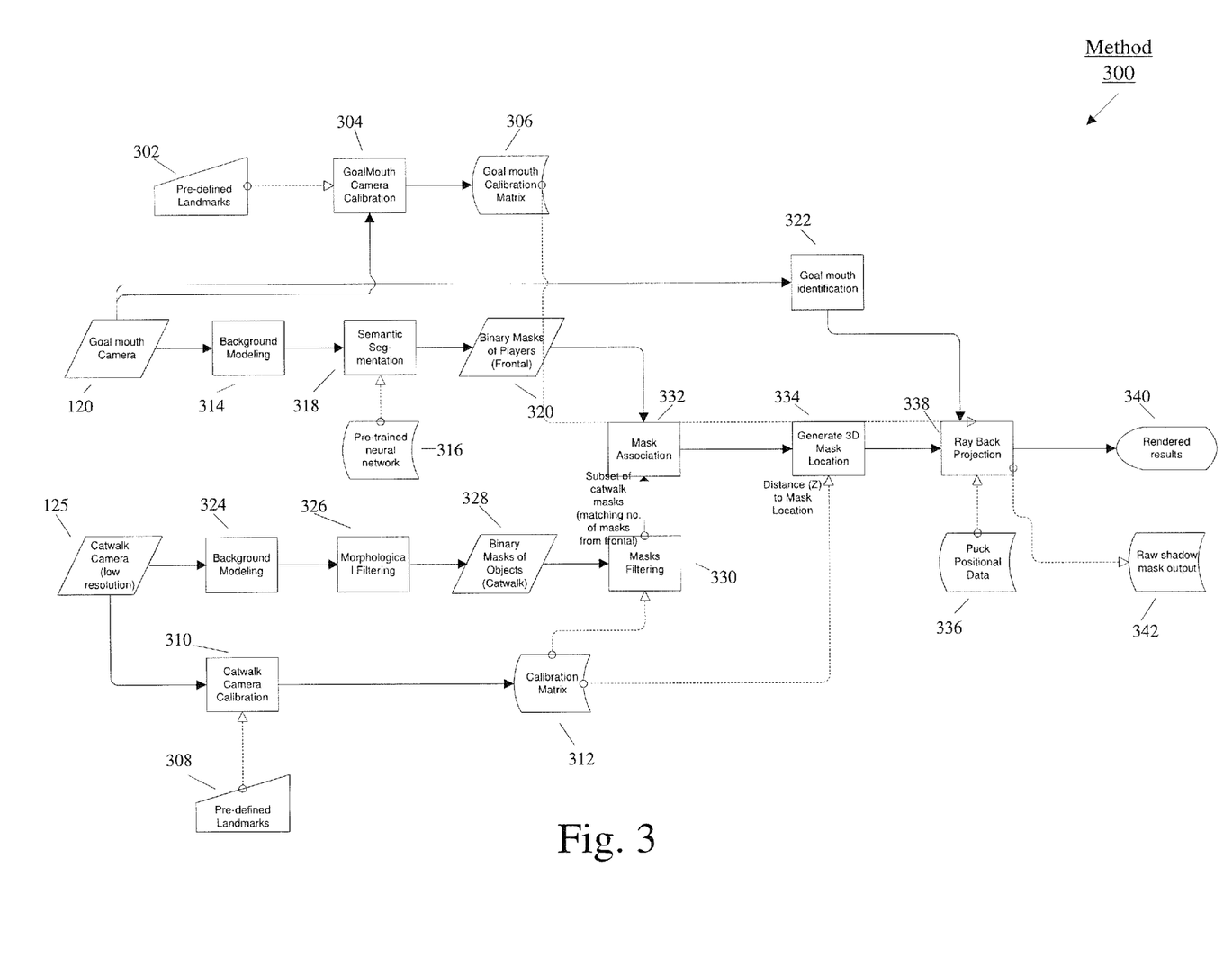
FIG. 3 illustrates an exemplary method for generating a ray projection to be cast on an area according to various exemplary embodiments described herein.

FIG. 3 illustrates an exemplary method 300 for generating a ray projection to be cast on an area according to various exemplary embodiments. The method 300 illustrates an exemplary calibration mode process and an exemplary operational mode process performed by the processing server 130 for the goalmouth camera 120 and the catwalk camera 125. The method 300 further illustrates the calibration mode processes and the operational mode processes generating a ray projection and obtaining a rendered result and a raw shadow mask output. As noted above, the processing server 130 may receive data from the goalmouth camera 120 and the catwalk camera 125 (e.g., using a direct communication pathway in a wireless or wired manner as illustrated in FIG. 1, via the network 135, etc.). Accordingly, the operations of the method 300 may be performed using the components of the processing server 130 (e.g., the processor, the memory arrangement, the transceiver, etc.).

In the calibration mode, the processing server 130 may use predefined landmarks 302, 308 to calibrate 304, 310 the goalmouth camera 120 and the catwalk camera 125, respectively. In ice hockey, the predefined landmarks 302, 308 may include the goal, the boards, the ice, the advertisements, the seats, etc. Those skilled in the art will understand that for different sporting events, different predefined landmarks and calculations may be determined. The processing server 130 may then generate a goalmouth calibration matrix 306 and a catwalk calibration matrix 312 for the goalmouth camera 120 and the catwalk camera 125, respectively. In an exemplary embodiment, a calibration matrix may be determined by extrinsic/intrinsic camera matrices using Bouguet's method, a one-dimensional calibration, generic algorithm based method, etc. Those skilled in the art will understand that one purpose of the calibration is to know the relationship between the camera view (or coordinates) and the real-world view (or coordinates).

The goalmouth calibration matrix 306 and the catwalk calibration matrix 312 may include a coordinate system to provide measurements. In an exemplary embodiment, a three-dimensional coordinate system may be used. In one example, an origin of (0, 0, 0) may be set at the center of the goal line on the ice, which would consequently be the center of the goalmouth at ice level. The x-axis of the coordinate system may run along the goal line. The y-axis of the coordinate system may run along the height, from the ice towards the crossbar of the goal. The z-axis of the coordinate system may run along the depth, from the origin to the goalmouth camera. The y-axis and the z-axis are labeled in FIG. 1, the x-axis being the third orthogonal axis extending out of the page.

In an exemplary embodiment, the goalmouth calibration matrix 306 and the catwalk calibration matrix 312 may use different axes of the coordinate plane for taking measurements. For example, the goalmouth calibration matrix 306 may use the x-axis and the y-axis and the catwalk calibration matrix 312 may use the z-axis. In another example, the catwalk calibration matrix 312 may use the x-axis and the z-axis. The catwalk calibration matrix 312 may use one or more dimensions depending whether the catwalk is positioned perpendicularly above the goal 115 or at an offset. Alternatively, the catwalk calibration matrix 312 may use two or more dimensions to aid in associating a position of a player seen via the goalmouth camera 120.

In the operational mode, the processing server 130 may identify objects, such as a player(s), the player's stick, the referee, the puck, etc. In an exemplary embodiment, the operational mode may use a predetermined or a generated background model 314, 324 for the goalmouth camera 120 and for the catwalk camera 125, respectively, to identify the objects. For example, the processing server 130 may identify the objects by determining which pixels are moving or which pixels are in contrast to the background model. As will be described below, in identifying the objects, from a selected perspective to an area, the objects that occlude the area may also be identified so that the ray projection may be determined.

In the method 300, two techniques are illustrated for identifying the objects (e.g., moving or stationary). For the data from the goalmouth camera 120, a semantic segmentation operation 318 may be used to identify the objects and generate contours for the identified objects. In an exemplary embodiment, the semantic segmentation operation 318 may rely on a pre-trained neural network 316. Specifically, the neural network 316 may have access to a data set that includes data for different categories of objects. In the example of ice hockey, the object categories may include the hockey puck, the players, the hockey stick, etc. The pre-trained neural network 316 may be based on any combination of previously collected data, publicly available data, test data, etc. Using the combination of data, a common model may be generated for the arena (e.g., hockey arena). The common model may then be fine-tuned for different arenas to achieve better accuracy.

Figure 4:
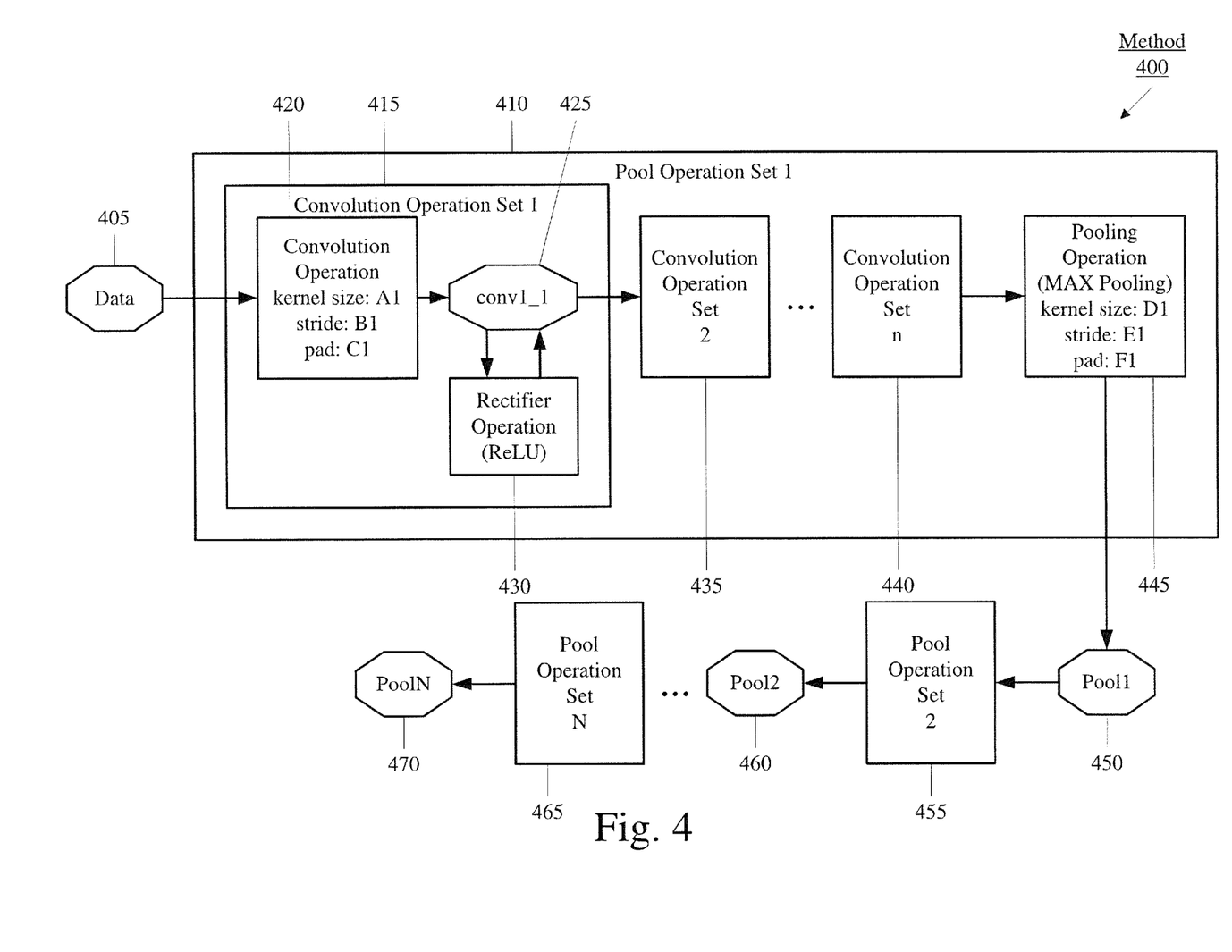
FIG. 4 illustrates an exemplary sequential training method of semantic segmentation according to an exemplary embodiment.
Figure 5:
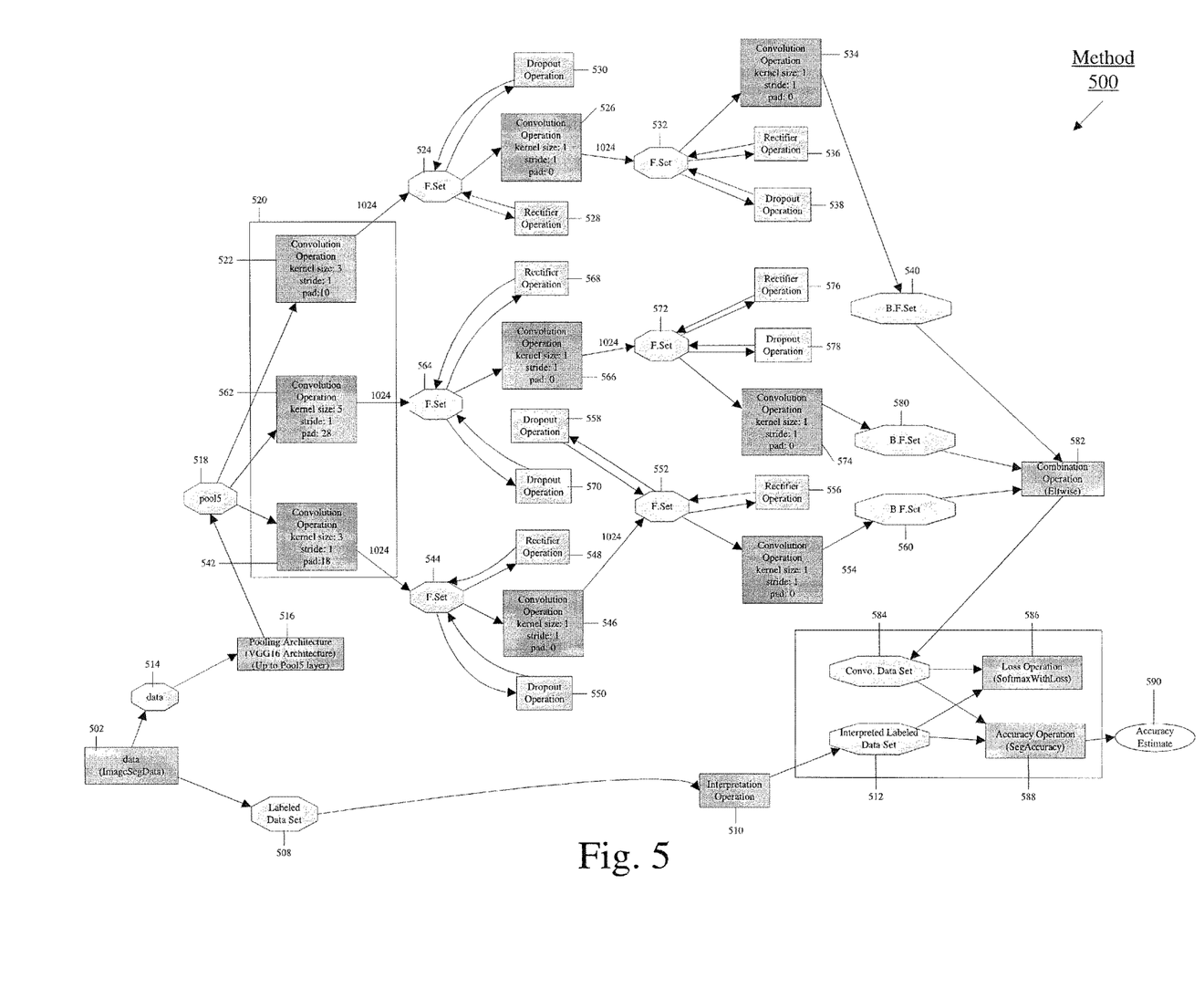
FIG. 5 illustrates an exemplary branched training method of semantic segmentation according to an exemplary embodiment.

The sematic segmentation operation 318 provides for an output of a segmentation mask that has the same resolution as the input frame. For example, the semantic segmentation operation 318 provides a set of mask frames of the same size as the input frames, in which each pixel indicates the likelihood of belonging to a specific type of the predefined objects (e.g., player, stick, puck, referee, etc.). This segmentation mask is provided based on an algorithm to be described below with regard to training methods illustrated in FIGS. 4 and 5. As will be described in further detail below, FIGS. 4 and 5 show the training aspect of the semantic segmentation operation 318 where the processing server 130 is trained using the dataset. As shown in FIG. 4, the segmentation training operation includes a single path or sequential operation while in FIG. 5, the segmentation training operation extends into a multipath or branched operation. Some features of this algorithm including the above-described network parameters used in this example include (1) reflecting the number of object types commonly seen in ice hockey; (2) representing the nature of the goalmouth camera; and (3) reducing the number of fully-connected layers to simplify the model complexity.

FIG. 4 illustrates an exemplary sequential training method 400 of the semantic segmentation operation 318 according to an exemplary embodiment. The method 400 illustrates an initial set of operations of the sematic segmentation 318 in which data 405 from the goalmouth camera 120 is processed from a convolution layer to a pool layer. The method 400 may process the data 405 using one or more pool operation sets in which each pool operation set generates a respective pool feature set. Each pool operation set may include one or more convolution operation sets and a pooling operation. Each convolution operation set may include a convolution operation to generate a convolution feature set that is processed with a feedback with a rectifier (e.g., a non-linear rectifier).

As illustrated, the data 405 may be fed into a first pool operation set 410. An output of the first pool operation set 410 may be a first pool feature set 450 (e.g., Pool1). The first pool feature set 450 may be used in a second pool operation set 455 which outputs a second pool feature set 460 (e.g., Pool2). This process may continue until an Nth pool operation set 465 outputs an Nth pool feature set 470 (e.g., PoolN). As those skilled in the art will understand, in image processing, each pool feature set may be a refined set from an input data or feature set that leads to an increased likelihood of identifying edges or semantic boundaries of objects (e.g., objects with a coherent semantic meaning including a human, a puck, a stick, etc.) which in turn are used to generate the corresponding masks of the objects.

To generate each pool feature set, the pool operation sets 410, 455, 465 may be used to process the input data or feature set. One or more convolution operation sets may be used. As illustrated, the data 405 may be fed into the first pool operation set 410, namely to a first convolution operation set 415. The first convolution operation set 415 may output data to a second convolution operation set 435. This process may continue until data is provided to an nth convolution operation set 440. The nth convolution operation set 440 may generate an output that is provided to a pooling operation 445. It is noted that the arrangement of the method 400 is only exemplary. The exemplary embodiments may also utilize modifications to the pool operation sets, the convolution operation sets, etc. with regard to when to perform the operation set, how to perform the operation set, etc. In a first example, the pool operation may be used at a predetermined number of convolution layers (e.g., 2). In a second example, the method 400 describes using the pooling operation 445 as a Max Pool but other pooling methods may be used (e.g., average pooling, L2-norm pooling, rank pooling, etc.). The exemplary embodiments may also utilize these various modifications to the method 400 (e.g., leading into subsequent processing, as will be described below).

As those skilled in the art will understand, each convolution operation set may be used to perform a convolution operation. As illustrated, the first convolution operation set 415 may include a convolution operation 420 to generate a convolution feature set 425 (e.g., conv1_1 denoting a first convolution feature set in the first convolution operation set 415) which may be activated or ramped with a rectifier operation 430 (e.g., employing rectified linear units (ReLU)). Thus, each of the convolution operation sets 415, 435, 440 may output a respective convolution feature set. The convolution operation 420 may be performed based on a value set for a kernel size (e.g., A1), a stride (e.g., B1), and a pad (e.g., C1). The kernel size may indicate a filter size or matrix upon which the convolution operation 420 is performed (e.g., a two dimensional kernel size of 3×3, although a three dimensional kernel size may also be used). In a particular implementation, the kernel size may correspond to a kernel used for edge detection. The stride may indicate a distance to be moved (e.g., pixel distance) in the image for an ensuing processing step of the convolution operation 420. The pad may indicate a distance between the units of the kernel that are to be included (e.g., a number of pixels). The pooling operation 445 may also utilize respective ones of the kernel size (e.g., D1), the stride (e.g., E1), and the pad (e.g., F1).

Each of the convolution operation sets 415, 435, 440 may utilize a convolution operation having respective values for a kernel size, a stride, and a pad. That is, the convolution operations may or may not have the same values set for these parameters. For example, the second convolution operation set 435 may use a respective kernel size (e.g., A2 (not shown)), a respective stride (e.g., B2 (not shown)), and a respective pad (e.g., C2 (not shown)) to generate a convolution feature set (e.g., conv 1_2 (not shown) denoting a second convolution feature set in the first convolution operation set 415). As will be described in an exemplary implementation, select convolution operations may use the same values whereas other convolution operations may use different values.

The method 400 being illustrated with at least three convolution operation sets and at least three pool operation sets is only exemplary. Those skilled in the art will appreciate that there may be any number of convolution operation sets and any number of pool operation sets. As will be described in an exemplary implementation, select pool operation sets may include fewer than three convolution operation sets whereas others may include three or more convolution operation sets. Select uses of the method 400 may include further pool operation sets. The number of convolution operation sets and the pool operation sets may be based on various factors (e.g., processing needs, efficiency requirements, etc.).

According to an exemplary implementation of the method 400 (e.g., using a VGG-16 architecture to construct a neural network), the data 405 from the goalmouth camera 120 may be processed into a refined pool feature set for further processing (to be described below). The exemplary implementation may utilize five pool operation sets to ultimately generate a fifth pool feature set. In generating the first pool feature set, the first pool operation set may utilize two convolution operation sets and a pooling operation. The convolution operation sets may have the same values set for the kernel size, stride, and pad (e.g., 3, 1, 1). The pooling operation may have respective values for the kernel size, stride, and pad (e.g., 3, 2, 1). Using the first pool feature set as the input, in generating the second pool feature set, the second pool operation set may again utilize two convolution operation sets and a pooling operation. The convolution operation sets and the pooling operation of the second pool operation set may have the same values as the convolution operation sets and the pooling operation of the first pool operation set (e.g., 3, 1, 1 and 3, 2, 1, respectively). Using the second pool feature set as the input, in generating the third pool feature set, the third pool operation set may utilize three convolution operation sets and a pooling operation. The convolution operation sets and the pooling operation of the third pool operation may have the same values as the convolution operation sets and the pooling operation of the second pool operation (e.g., 3, 1, 1 and 3, 2, 1, respectively). Using the third pool feature set as the input, in generating the fourth pool feature set, the fourth pool operation set may again utilize three convolution operation sets and a pooling operation. The convolution operation sets of the fourth pool operation may have the same values as the convolution operation sets of the third pool operation (e.g., 3, 1, 1).

However, the pooling operation of the fourth pool operation may be modified (e.g., 3, 1, 1). Using the fourth pool feature set as the input, in generating the fifth pool feature set, the fifth pool operation set may again utilize three convolution operation sets and a pooling operation. The convolution operation sets of the fifth pool operation may be modified but consistent (e.g., 3, 1, 2). The pooling operation of the fifth pool operation may have the same values as the pooling operation of the fourth pool operation set (e.g., 3, 1, 1). Those skilled in the art will understand that the above description was only one example of an exemplary implementation provided for context. Other implementations may use any number of pool operation sets, convolution operation sets, or kernel size, stride, and pad values.

FIG. 5 illustrates an exemplary branched training method 500 of the semantic segmentation operation 318 according to an exemplary embodiment. The method 500 may illustrate an expanded or comprehensive manner in which the processing server 130 performs the semantic segmentation operation 318 according to the exemplary embodiments. For example, based on an input of the goalmouth camera (indicated as segmentation data 502), the processing server 130 may process the data to generate accuracy data used to determine masks of objects/players. As will be indicated below, the method 500 may incorporate the method 400. It is noted that the method 500 may illustrate a training phase for developing the neural network used in the exemplary embodiments. However, those skilled in the art will understand that the method 500 may include select modifications to also illustrate a normal operation phase for using the neural network according to the exemplary embodiments, select ones of the modifications being described herein.

The segmentation data 502 may be generated by the goalmouth camera 120 and provided to the processing server 130. In an exemplary embodiment, the segmentation data 502 may be initially filtered such that the image data that is captured is at least one of narrowed, formatted, configured, etc. to segmentation data 502 (e.g., ImageSegData) to be used for the semantic segmentation operation 318 using any known data processing operation. The segmentation data 502 may then be processed in a variety of manners. For example, a labeling operation may be performed on the segmentation data 502 to generate a labeled data set 508. An interpretation operation 510 may be performed on the labeled data set 508 to generate an interpreted labeled data set 512. The interpreted labeled data set 512 will be described in further detail below. The interpreted labeled data set 512 may represent ground truth data applied to a further output as the segmentation data 502 is processed according to the exemplary embodiments. It is noted that the labeled data set 508 and the interpreted labeled data set 512 may be components used during the training phase and may be omitted from the normal operation phase.

The segmentation data 502 may also be further processed for the semantic segmentation operation 318. For example, the segmentation data 502 may be configured as data 514 (corresponding to the data 405 in the method 400 of FIG. 4). The data 514 may be input to the sequential training method 400 (indicated as a pooling architecture 516, an example of which is a VGG16 architecture). As indicated in the method 500, the sequential training method 400 may be used until a fifth pool feature set 518 (e.g., pools) is generated. For example, the above described exemplary implementation using the indicated values for the kernel size, stride, and pad along with the number of convolution operation sets and pool operation sets may be used in creating the fifth pool feature set 518.

The fifth pool feature set 518 may be used for further processing along a branched pathway 520. According to the exemplary embodiments, the fifth pool feature set 518 may be processed in the branched pathway 520 as fully connected blocks utilizing different values for the kernel size, stride, and pad in the convolution operations. As illustrated, the branched pathway 520 may include three branches with a first set of fully connected blocks, a second set of fully connected blocks, and a third set of fully connected blocks. The use of three branches of fully connected blocks is only exemplary and the exemplary embodiments may utilize any plurality of branches for the further processing as an extension of the sequential training method (e.g., the pooling architecture 516). The number of branches in the branched pathway 520 may be based on various conditions. For example, a distance between a point from which a perspective of the ray projection is determined to an area may define a number of branches to be used. Accordingly, relatively small distances may use a smaller number of branches whereas relatively large distances may use a greater number of branches.

According to an exemplary implementation, when the goalmouth camera 120 captures images in a 4 k resolution, the pad value may be modified accordingly to increase a rate at which the segmentation frequency is performed. Therefore, the branched pathway 520 may include three branches with three different pad values. The kernel size may also be modified based on the pad value. As illustrated, a first branch via a convolution operation 522 may utilize a kernel size, stride, and pad having values 3, 1, 10; a second branch via a convolution operation 542 may utilize a kernel size, stride, and pad having values 3, 1, 18; and a third branch via a convolution operation 562 may utilize a kernel size, stride, and pad having values 5, 1, 28. It is noted that the pad value may affect the convolution operation with regard to respective considerations for using the different branches. The pad value may affect the sampling interval of the matrix (e.g., kernel size). Therefore, the intervals between two kernel elements may be spaced apart based on the pad value, resulting in an application to pixels that are spaced apart by the pad value. For example, a pad value of 18 means two elements in the kernel are applied to two pixels that are 18 units apart. As those skilled in the art will understand, a smaller pad value in conjunction with the kernel may provide an increased accuracy for the segmentation process.

In a particular implementation with regard to a hockey game, the three branched operations with different pad values may represent the nature of a typical ice hockey goal shooting scenario. For example, there may be three layers of depths where players are clustered (e.g., a first layer of a "defense" wall that tries to interfere with the shot, a second layer of players usually closer to the goalmouth, and a third layer of a goaltender alone). The differences in the depths at the different layers with respect to the goalmouth camera 120 results in the objects/players appearing smaller or bigger in the images due to the perspective geometry. To faithfully capture these three clusters, three branched operations with different pad values are designed to incorporate these differences. It is noted that the pad values may dictate how kernels are sampling the images, and in turn, may have a correct sensitivity to different sizes of players/objects at different depths. It is also noted that this design and configuration may be dynamic and flexible to accommodate different settings and implementations using corresponding pad values.

Each branch of the branched pathway 520 may include further fully connected layers. As illustrated in the method 500, each branch may have two additional fully connected layers. However, it is noted that the use of two additional fully connected layers is only exemplary and any number of additional fully connected layers may be used in the method 500. As noted above, the number of additional fully connected layers may be defined based on a variety of factors (e.g., intended accuracy threshold).

In the first branch, the convolution operation 522 (e.g., using kernel size, stride, and pad of 3, 1, 0) may generate a convolution feature set 524 (the plurality of convolution feature sets referred to in FIG. 5 as "F.Set"). The convolution feature set 524 may be processed with a rectifier operation 528. The method 500 also shows that a dropout operation 530 may be used to refine the convolution feature set 524. However, the use of the dropout operation 530 is only exemplary and the method 500 may omit the dropout operation 530 (e.g., using the dropout operation 530 during a training phase only and omitting the dropout operation 530 during a normal operation phase). The convolution feature set 524 may be input to a further convolution operation 526 along the fully connected blocks of this branch. The convolution operation 526 may use a kernel size, stride, and pad having values 1, 1, 0. The convolution operation 526 may generate a convolution feature set 532. The convolution operation 526 may represent a first additional fully connected layer for this first branch. The convolution feature set 532 may be processed with a rectifier operation 536 and a dropout operation 538. The convolution feature set 532 may then be input to an additional convolution operation 534 along the fully connected blocks of this branch. The convolution operation 534 may represent a second additional fully connected layer for the first branch. The convolution operation 534 may output a first branch convolution feature set 540 (the plurality of branch convolution feature sets referred to in FIG. 5 as "B.F.Set"), which will be described below.

In the second branch, the convolution operation 542 (e.g., using kernel size, stride, and pad of 3, 1, 18) may generate a convolution feature set 544. The convolution feature set 544 may be processed with a rectifier operation 548 and a dropout operation 550. The convolution feature set 544 may be input to a further convolution operation 546 along the fully connected blocks of this branch. The convolution operation 546 may use a kernel size, stride, and pad having values 1, 1, 0. The convolution operation 546 may generate a convolution feature set 552. The convolution operation 546 may represent a first additional fully connected layer for this second branch. The convolution feature set 552 may be processed with a rectifier operation 556 and a dropout operation 558. The convolution feature set 552 may then be input to an additional convolution operation 554 along the fully connected blocks of this branch. The convolution operation 554 may represent a second additional fully connected layer for the second branch. The convolution operation 554 may output a second branch convolution feature set 560, which will be described below.

In the third branch, the convolution operation 562 (e.g., using kernel size, stride, and pad of 5, 1, 28) may generate a convolution feature set 564. The convolution feature set 564 may be processed with a rectifier operation 568 and a dropout operation 570. The convolution feature set 564 may be input to a further convolution operation 566 along the fully connected blocks of this branch. The convolution operation 566 may use a kernel size, stride, and pad having values 1, 1, 0. The convolution operation 566 may generate a convolution feature set 572. The convolution operation 566 may represent a first additional fully connected layer for this third branch. The convolution feature set 572 may be processed with a rectifier operation 576 and a dropout operation 578. The convolution feature set 572 may then be input to an additional convolution operation 574 along the fully connected blocks of this branch. The convolution operation 574 may represent a second additional fully connected layer for the third branch. The convolution operation 574 may output a third branch convolution feature set 580, which will be described below.

The first branch convolution feature set 540, the second branch convolution feature set 560, and the third branch convolution feature set 580 may be input to a combination operation 582 (e.g., an Eltwise operation). The combination operation 582 may process the convolution feature sets 540, 560, 580 individually and in combination to output a combination convolution data set 584 (e.g., Convo. Data Set). The combination convolution data set 584 with the interpreted labeled data set 512 may be used in a loss operation 586 (e.g., to omit or remove data unnecessary for the semantic segmentation operation 318 using, for example, a Softmax With Loss operation) and an accuracy operation 588 (e.g., to determine an accuracy relative to an accuracy threshold for edge detection of objects for the semantic segmentation operation 318 using, for example, a Segmentation Accuracy operation). The accuracy operation 588 may then output an accuracy estimate 590 for the objects in the image from the goalmouth camera 120. It is noted that the loss operation 586 and the accuracy operation 588 may be components used during the training phase and may be omitted from the normal operation phase. Thus, without the interpreted labeled data set 512, the loss operation 586, and the accuracy operation 588, the combination convolution data set 584 may be the output using the exemplary embodiments during the normal operation phase.

Returning to the method 300, the semantic segmentation operation 318 (e.g., as described above with regard to the methods 400, 500) may be used for object detection to generate corresponding masks (e.g., objects having an accuracy greater than the accuracy threshold are positively identified for a mask to be generated). Accordingly, the semantic segmentation operation 318 may output binary masks 320 of objects. The processing server 130 may apply the semantic segmentation operation 318 learning algorithm using stored or historical data and the data for objects in the current frame to identify each of the objects in the frame. Since the semantic segmentation operation 318 is a learning algorithm, as more data is collected, the processing server 130 should improve at detecting specific objects and the processing server 130 should improve at identifying specific objects and their contours. This is because, at least in part, as more data is collected, the data may be used to fine tune the pre-trained neural network 316. In a first example, the output of the semantic segmentation operation 318 may include a binary mask 320 of objects (e.g., players). The binary mask 320 may be considered a simple YES or NO (or 1 or 0) determination of whether an object currently occupies a specific location (e.g., pixel corresponding to a real-world coordinate). The use of the binary mask 320 will be described in greater detail below.

It should be understood that the semantic segmentation operation 318 may also differentiate objects of the same category. For example, the semantic segmentation operation 318 may differentiate between a first player and a second player, and each player may be output as an independent binary mask.

Figure 6:
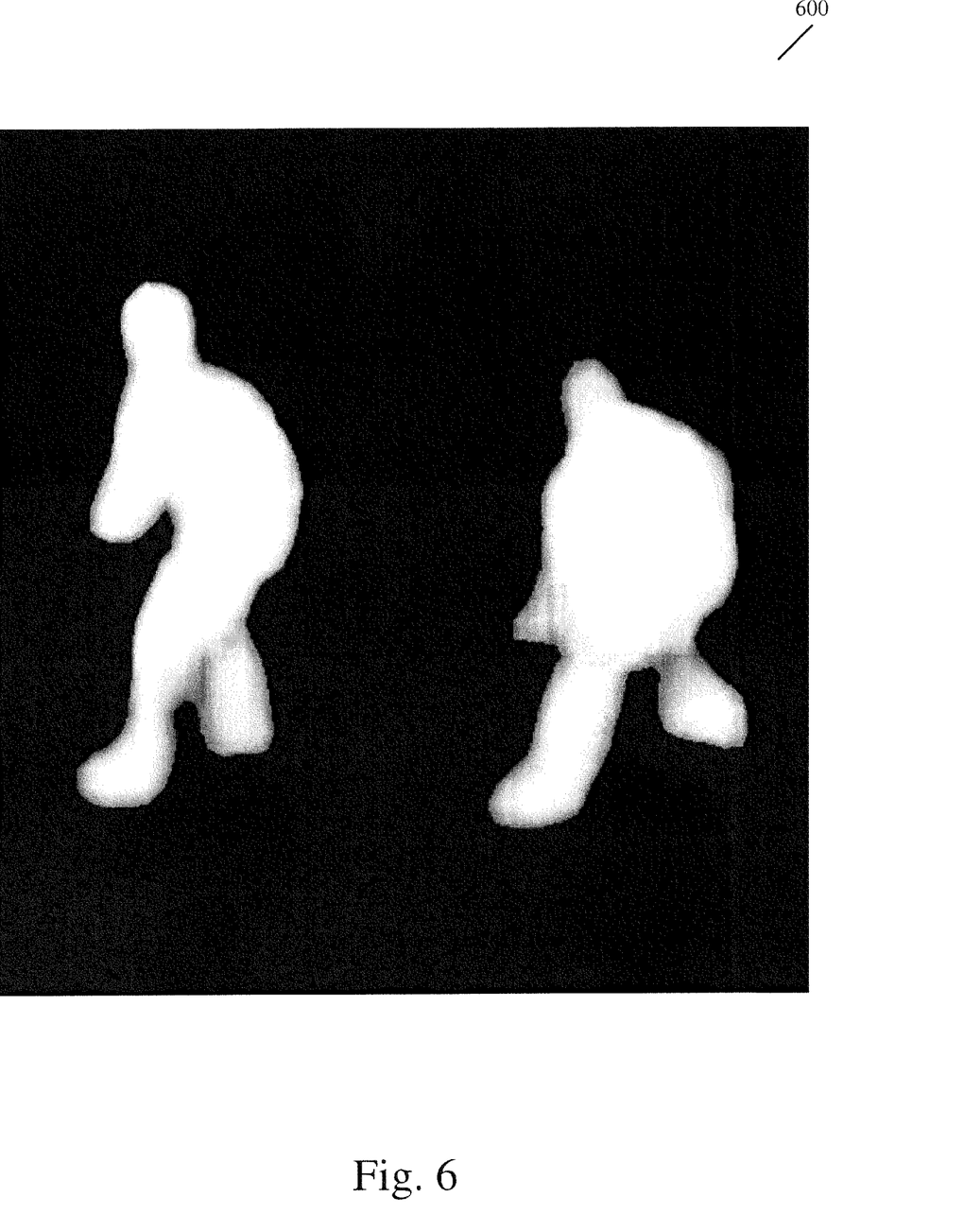
FIG. 6 illustrates exemplary grayscale masks derived from a video frame according to various exemplary embodiments described herein.

In a second example, the output of the semantic segmentation operation 318 may include a grayscale mask. The grayscale mask may indicate the likelihood or confidence of a pixel being an object (e.g., player). It should be noted that while the remainder of the exemplary embodiments will be described with regard to the binary mask 320, the grayscale mask may be used interchangeably with the binary mask 320. FIG. 6 shows some exemplary grayscale masks 600 derived from a video frame.

In a second exemplary embodiment, a morphological filtering operation 326 may be used to filter objects captured by the catwalk camera 125. The morphological filtering operation 326 (e.g., OpenCV) is a filtering operation where the masks are determined and appropriately filtered. The filter may be based on any characteristic such as size, shape, etc. In an exemplary embodiment, the morphological filtering operation 326 may filter out small noisy-like masks and smooth or combine nearby masks to achieve a better consistency with regard to various objects (e.g., objects commonly seen in a typical application). The morphological filtering operation 326 may be used for the catwalk camera 125 to reduce the noisy masks that are output by the previous operations. Again, as the filtering is performed over time, the filtering characteristics may be tuned to accurately identify different objects. Similar to the semantic segmentation operation 318, the output of the morphological filtering operation 326 may also be a set of binary masks 328 (or grayscale masks) associated with each identified object. However, unlike the binary masks 320 generated by the semantic segmentation operation 318, the binary masks 328 (or grayscale masks) generated by the morphological filtering operation 326 may be further filtered using a mask filtering operation 330 to further refine the binary masks 328. For example, the mask filtering operation 330 may determine a center of mass for each binary mask 328. To determine the center of mass, the filtering process 330 may use data from the catwalk calibration matrix 312. One of the goals of the mask filtering operation 330 is to match the number of masks obtained for the catwalk camera 125 frame to the number of masks obtained for the goalmouth camera 120 frame.

It should be understood that while the above describes two exemplary manners of identifying objects or objects of interest in corresponding frames captured by the two cameras 120 and 125, other identifying methods or algorithms may also be used. That is, as can be seen from the above examples, the goal of the identifying operations is to identify the same objects in the different frames and any manner of performing the identification may be used.

In 332, the processing server 130 may associate the first set of binary masks to the second set of binary masks to create a 3D mask. In a first exemplary embodiment, the binary mask from the goalmouth camera 120 may be matched to the binary mask from the catwalk camera 125 by physical appearance, such as a player's jersey, a player's number, a player's color, etc. In a second exemplary embodiment, the binary mask from the goalmouth camera 120 may be matched to the binary mask from the catwalk camera 125 by geometric consistency. Geometric consistency may include a distance matching, a center of mass matching, etc. The first set of binary masks and the second set of binary masks may provide the coordinates of their respective binary masks, which will be used to generate a 3D mask location in 334. For example, the binary mask from the goalmouth camera 120 may provide the x-axis coordinate and the y-axis coordinate and the binary mask from the catwalk camera 125 may provide the z-axis coordinate.

In 334, the processing server 130 may generate a 3D mask location for each 3D mask. In an exemplary embodiment, the 3D mask location may be generated using at least one of the coordinates from the three-dimensional coordinate system. For example, as discussed above, the 3D mask location may be generated using the x-axis coordinate, the y-axis coordinate and the z-axis coordinate determined in 332. Accordingly, the 3D mask location may be relative to a coordinate system with a selected reference point such as the coordinate system implemented in the system 100 of FIG. 1.

In 338, the processing server 130 may generate a ray projection from the puck towards the goalmouth. The ray projection may be considered as a "virtual camera" and indicate an area(s) of the goalmouth that is obstructed by the player(s) and the players' sticks as perceived from a current location of the puck, an offensive player, etc. The processing server 130 may use the goalmouth calibration matrix 306, a goalmouth identification 322, the 3D mask location 334, and puck positional data 336 to generate the ray projection 338. The puck positional data 336 may be determined during the operational mode using the methods described above or may also be generated from other known object tracking methods. In 340, the results may be rendered for viewing by the end user device 140. In addition, a raw shadow mask output 342 may be generated by the processing server 130.

It should be understood that the use of a puck perspective is only exemplary and that the ray projection may be generated from the point of view of any player, any object or from any location in the arena. For example, the ray projection may be generated from the perspective of the player shooting the puck or from the player about to receive a pass. In another example, relating to the sport of football, the ray projection may be generated from the perspective of the quarterback or from the football.

For example, after 334, the processing server 130 has the player contours and their 3D position in real-world coordinates. Thus, instead of providing puck data in 336, any interested object's position could be provided (e.g., the eyes of the hockey player, the eyes of the quarterback, etc.). Then, in 338, the rays can be projected from this object's perspective. This allows many storytelling possibilities. The exemplary embodiments allow for this ray casting from different perspectives because the exemplary embodiments find the boundaries of a real-world volume (not just a center of mass) to determine the occlusion from a point cast to a goal area. Thus, the exemplary embodiments are different from current player tracking systems which can only provide a generalized point from which to cast a player's point of view (POV) ray.

In the current example, the contours and puck position may be updated on a per frame basis such that for every new frame a new player contour is obtained and rays are generated. However, in 332, when associating masks, a geometry consistency check is performed to take past frames into consideration so that the masks of the corresponding objects do not make a precipitous movement that is unlikely. In one example, a 5-frame window moving average with decaying weights for past frames may be used to perform this geometry check.

As seen in FIG. 2A, the ray projection casts a shadow 202 on the goalmouth from the view of the goalmouth camera 120. The shadow may show an area of the goalmouth that is obstructed by the goalie or other player or object. It should be noted that no shadow from players number 12 and 28 are cast on the goalmouth because their position does not obstruct the trajectory of the puck with regards to the goalmouth. FIG. 2B shows the ray projection from the view of the catwalk camera 125. Again, a shadow 204 shows an area of the goalmouth that is obstructed by the goalie. Those skilled in the art would understand that different visual effects may be used to show the ray projection, such as, for example, a bar 206 on the goal line as seen in FIG. 2B.

In an exemplary embodiment, the processing server 130 may determine hotspots of an area(s) on the goalmouth where the puck is most likely to cross the goal line. The hotspots may be projected onto the goalmouth. For example, referring to FIG. 2A, the processing server 130 may determine that the area in the upper left side of the goalmouth is the most likely area where the puck may cross the goal line. This may be indicated by, for example, a heatmap, but those skilled in the art would understand that other methods may be used to indicate the hotspot(s). The hotspot may be determined based on one or more factors, which may include, for example, statistical data relating to locations where the puck crossed the goal line, statistical data relating to the goalie in net, the distance of the goalie to unobstructed areas at the goalmouth, the proximity of the goal post or crossbar, the puck's angle or velocity, etc.

The exemplary embodiments described above are with regard to using the goalmouth camera 120 and the catwalk camera 125 to provide respective image data such that a parallel processing is performed until converging at the mask association 332. However, as noted above, the exemplary embodiments may be performed with a single camera (e.g., the goalmouth camera 120). In such an embodiment, the processing server 130 may be configured to receive or determine further information or metadata regarding the area being captured, the goalmouth camera 120, etc. In this manner, the information corresponding to the catwalk camera 125 used by the mask association 332 may be determined without receiving image data from the catwalk camera 125 but still compensated to perform the remainder of the method 300.

The exemplary embodiments may also be modified to provide further features. In a first example, the puck positional data 336 is provided to generate the ray projection 338 in the method 300. The puck positional data 336 may be provided due to images being captured by the goalmouth camera 120 (even in 4 k resolution) being blurred and incapable of identifying a location of the puck because the puck is moving at a high speed. When the puck is selected for the perspective from which the ray projection is cast, the puck position data 336 may be received for the proper ray projection to be generated. However, when the goalmouth camera 120 is configured with a higher speed capturing mechanism or the processing server 130 is properly configured to process the images of the goalmouth camera 120 to eliminate blur to identify an object, the processing server 130 may generate the ray projection 338 without the puck positional data 336 or any other positional data of otherwise blurred objects. When the puck position is identified, the processing server 130 may further be configured to identify the puck in the semantic segmentation operation 318.

In a second example, the processing server 130 may be configured to select various perspectives from which to cast the ray projection. For example, the exemplary embodiments are described with regard to the perspective of the puck. However, the ray projection may also be generated based on a perspective of a shooting player. According to an exemplary embodiment, the semantic segmentation operation 318 may be configured to generate one or more masks for the various objects. For example, the semantic segmentation operation 318 may generate one mask for the puck. In another example, the semantic segmentation operation 318 may generate a plurality of masks for different body parts of a player. In a further example, an individual body part may include a plurality of masks. In this manner, the semantic segmentation operation 318 may identify these objects as components or as a whole to generate corresponding masks. This separation of masks for a single object may enable a greater accuracy or finer granularity of detecting edges or semantic boundaries of objects for an improved generation of the ray projection. The plurality of masks may also enable an improved perspective of a player based on a viewpoint (e.g., eyes) of the player. When a mask of the head of the player is generated, an estimate of the eyes relative to a length of the head (e.g., ⅔ a distance from a bottom of the head) may be used to pinpoint the perspective of the player. In this manner, the processing server 130 may be configured to determine the ray projection based on information that is determined from the images of the camera(s) without using data being received (e.g., puck positional data 336, player identification data, etc.).

Therefore, the exemplary embodiments described above may enable viewers of sporting events to see a point of view of an object associated with the sporting event. It should be understood that the above exemplary embodiments may be implemented during the live event or during a replay of the event. For example, the ray projection may be cast on the goalmouth while viewers of a hockey game are watching the game live, or the ray projection may be cast on the goalmouth during a replay of a certain sequence of events.

Those of skill in the art will understand that the above-described exemplary embodiments may be implemented in any number of matters, including as a software module, as a combination of hardware and software, etc. For example, the functions of the processing server 130 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
    identifying a first object in a first frame captured by a first camera using a semantic segmentation operation, the semantic segmentation operation including a branched training process that convolutes image data associated with the first object in the first frame along a plurality of branched paths having respective convolution parameters, the convoluted image data from each of the branched paths being combined into a combination convoluted data set;
    determining a first mask for the first object based on the first frame captured by the first camera and the combination convoluted data set;
    determining a second mask for the first object based on a second frame captured by a second camera;
    generating a 3D mask by associating the first mask and the second mask;
    determining a location of the 3D mask; and
    generating a ray projection of the 3D mask from a perspective of a second object.

2. The method of claim 1, further comprising:
    determining a first calibration matrix for the first camera, wherein the ray projection is generated based at least in part on the first calibration matrix.

3. The method of claim 1, further comprising:
determining a second calibration matrix for the second camera, wherein the location of the 3D mask is determined based at least in part on the second calibration matrix.

4. The method of claim 1, wherein the first object is one of a hockey player, hockey stick, or hockey referee and the second object is a hockey puck.

5. The method of claim 1, wherein the semantic segmentation operation utilizes a pre-trained neural network identifying categories of objects.

6. The method of claim 1, wherein the branched training process includes a plurality of branched pool operation sets configured in parallel to generate respective branched pool feature sets, each of the branched pool operation sets including a plurality of convolution operation sets generating respective convolution feature sets and a branched pooling operation generating the respective branched pool feature sets, the branched training process further including a combination operation to combine the branched pool feature sets into the combination convoluted data set.

7. The method of claim 6, wherein each of the branched pool operation sets includes at least one fully connected block, each fully connected block including a respective convolution operation set.

8. The method of claim 6, wherein each of the convolution operation sets includes a respective convolution operation defined with respective ones of a kernel size value, a stride value, and a pad value.

9. The method of claim 1, further comprising:
identifying the first object from the first frame using a morphological filtering operation.

10. The method of claim 1, wherein each of the first mask and the second mask is a binary mask, a grayscale mask, or a combination thereof.

11. The method of claim 1, further comprising:
identifying the first object in at least one of the first frame or the second frame based on a background model.

12. A processing server, comprising:
a transceiver configured to receive a first frame captured by a first camera and a second frame captured by a second camera; and
a processor configured to identify a first object in a first frame captured by a first camera using a semantic segmentation operation, the semantic segmentation operation including a branched training process that convolutes image data associated with the first object in the first frame along a plurality of branched paths having respective convolution parameters, the convoluted image data from each of the branched paths being combined into a combination convoluted data set, the processor configured to determine a first mask for the first object based on the first frame and the combination convoluted data set and determine a second mask for the first object based on the second frame, the processor configured to generate a 3D mask by associating the first mask and the second mask, the processor configured to determine a location of the 3D mask, the processor configured to generate a ray projection of the 3D mask from a perspective of a second object.

13. The processing server of claim 12, wherein the processor is further configured to determine a first calibration matrix for the first camera, wherein the ray projection is generated based at least in part on the first calibration matrix, a second calibration matrix for the second camera, wherein the location of the 3D mask is determined based at least in part on the second calibration matrix, or a combination thereof.

14. The processing server of claim 12, wherein the first object is one of a hockey player, hockey stick, or hockey referee and the second object is a hockey puck.

15. The processing server of claim 12, wherein the semantic segmentation operation utilizes a pre-trained neural network identifying categories of objects.

16. The processing server of claim 12, wherein the branched training process includes a plurality of pool operation sets, each pool operation set including a plurality of convolution operation sets and a pooling operation, each convolution operation set including a plurality of convolution operations.

17. The processing server of claim 16, wherein each of the convolution operation sets includes a respective convolution operation defined with respective ones of a kernel size value, a stride value, and a pad value.

18. The processing server of claim 12, wherein the processor is further configured to identify the first object from the first frame using a morphological filtering operation.

19. The processing server of claim 12, wherein each of the first mask and the second mask is a binary mask, a grayscale mask, or a combination thereof.

20. A method, comprising:
receiving a first frame captured by a first camera;
performing a sequential training process on the first frame to identify a first object in the first frame based on the first frame, the sequential training process including a plurality of sequential pool operation sets configured sequentially to generate respective sequential pool feature sets, each of the sequential pool operation sets including a plurality of convolution operation sets generating respective convolution feature sets and a sequential pooling operation generating the respective sequential pool feature sets;
performing a branched training process on the first frame to identify the first object in the first frame based on an output of the sequential training process, the branched training process including a plurality of branched pool operation sets configured in parallel to generate respective branched pool feature sets, each of the branched pool operation sets including a plurality of convolution operation sets generating respective convolution feature sets and a branched pooling operation generating the respective branched pool feature sets, the branched training process further including a combination operation to combine the branched pool feature sets into a combination data set;
determining an accuracy estimate of a semantic boundary of the first object; and
generating a first mask for the first object in the first frame based on the accuracy estimate.

* * * * *